United States Patent [19]

Smith

[11] 4,431,328
[45] Feb. 14, 1984

[54] HEMISPHERICAL BALL AND SOCKET JOINT

[75] Inventor: Joseph E. Smith, Birmingham, Mich.

[73] Assignee: O & S Manufacturing Company, Whitmore Lake, Mich.

[21] Appl. No.: 263,778

[22] Filed: May 14, 1981

Related U.S. Application Data

[63] Continuation-in-part of Ser. No. 61,644, Jul. 30, 1979.

[51] Int. Cl.³ ............................................. F16C 11/06
[52] U.S. Cl. ....................................... 403/36; 403/132; 403/138
[58] Field of Search ............... 403/132, 133, 130, 138, 403/124, 125, 126, 127, 39, 36

[56] References Cited

U.S. PATENT DOCUMENTS

| | | | |
|---|---|---|---|
| 2,848,260 | 8/1958 | Moskovitz | 403/126 X |
| 3,007,728 | 11/1961 | Hoffman | 403/132 |
| 3,376,058 | 4/1968 | Herbenar | 403/126 |
| 3,689,100 | 9/1972 | Schmid | 403/125 X |

FOREIGN PATENT DOCUMENTS

| | | | |
|---|---|---|---|
| 180199 | 11/1954 | Austria | 403/126 |
| 1050887 | 9/1953 | France | 403/124 |
| 1323319 | 2/1963 | France | 403/133 |
| 1111280 | 4/1968 | United Kingdom | 403/130 |
| 1200343 | 7/1970 | United Kingdom | 403/133 |

Primary Examiner—Andrew V. Kundrat
Attorney, Agent, or Firm—Hauke and Patalidis

[57] ABSTRACT

A knuckle or swivel joint of the half-ball and socket type comprising a stud terminating in an enlarged diameter half-ball member disposed in the socket member and having a recess in which is engaged a biasing insert member made of resilient or elastomeric material placed under compression during assembly of the joint. The joint bearing surfaces are elastically pre-loaded in an appropriate direction which causes firm engagement of the bearing surfaces in mutual engagement and thus preventing play and rattling of the joint and compensating for wear.

21 Claims, 11 Drawing Figures

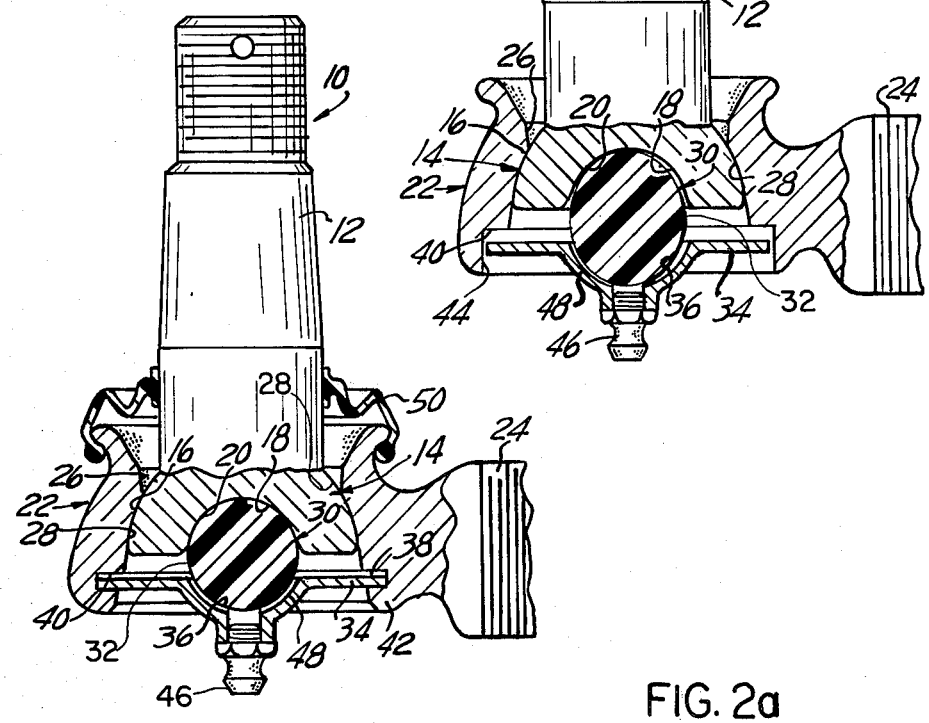
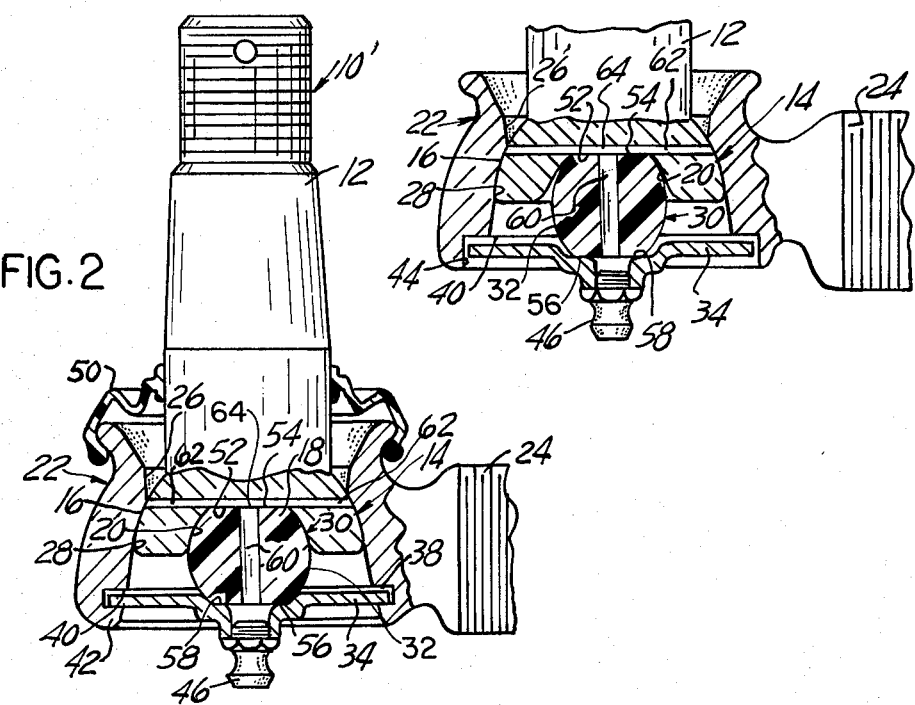

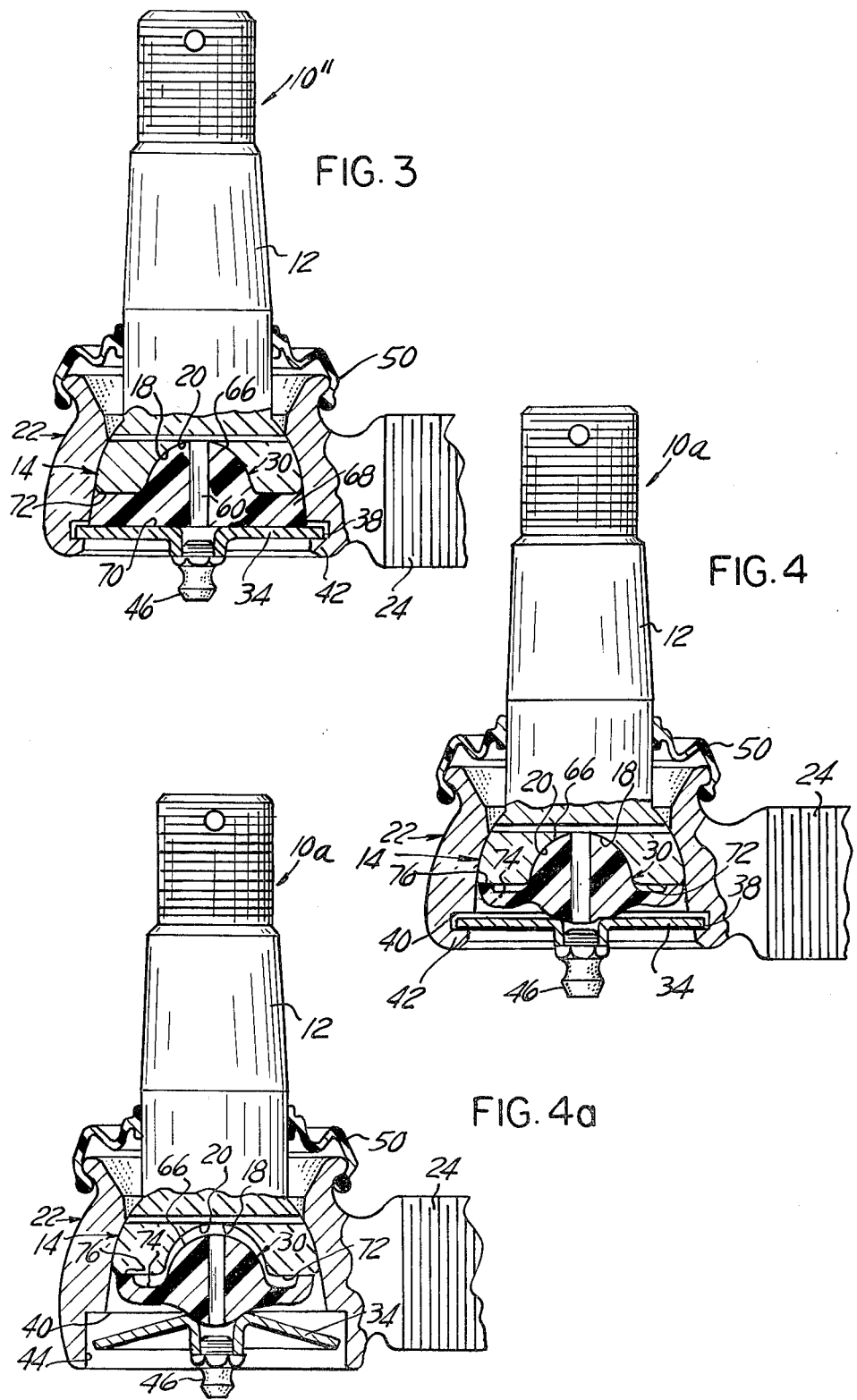

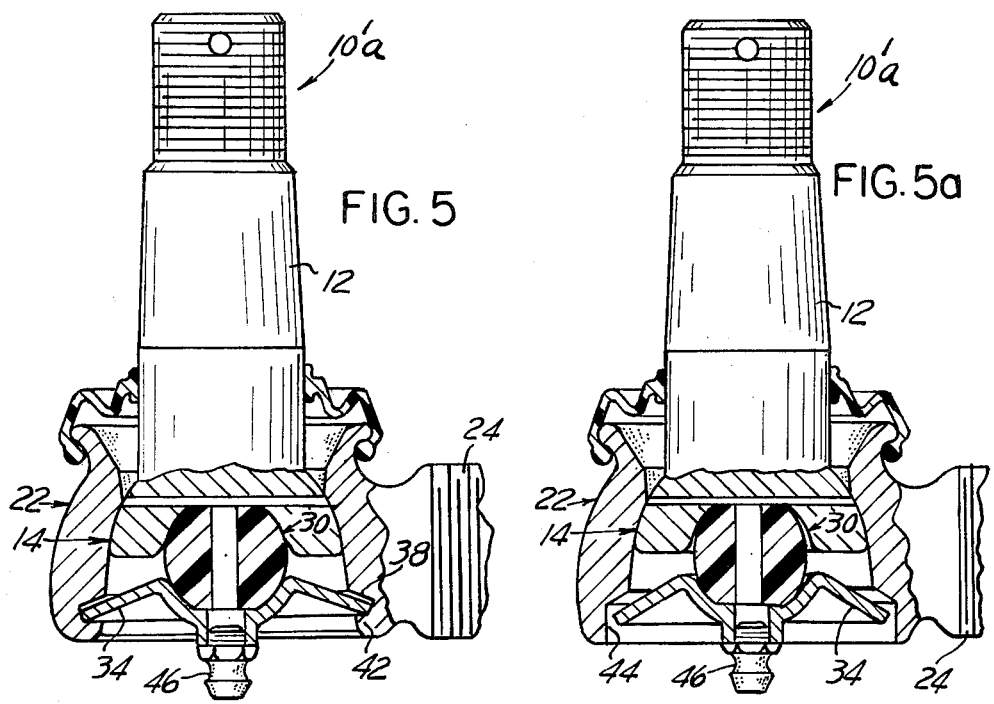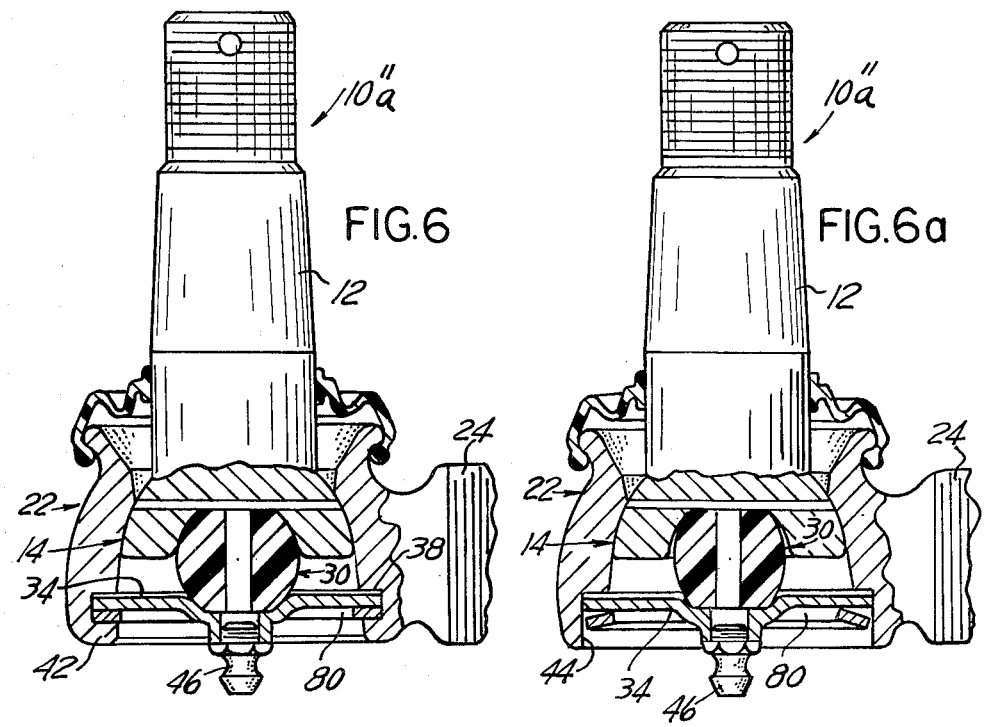

HEMISPHERICAL BALL AND SOCKET JOINT

CROSS-REFERENCE TO RELATED APPLICATIONS

The present application is a continuation-in-part of application Ser. No. 061,644, filed July 30, 1979, and assigned to the same assignee as the present application.

BACKGROUND OF THE PRESENT INVENTION

The present invention relates to a bearing assembly for a knuckle or swivel joint.

Knuckle or swivel joints of the half-ball and socket type are commonly used in motor vehicle steering tie rod assemblies, in drag links, torque rods and like structures, in which there is a requirement for transmitting a force from a member to another while permitting one member to swivel or pivot relative to the other.

Knuckle or swivel joints of the half-ball and socket type consist generally of a stud terminating in a partial ball disposed within a socket member in swivelling slidable engagement with a conforming concave spherical segment of the socket member. The engaged bearing surfaces of the half-ball and socket are often biased towards each other such as to provide a relatively tight assembly eliminating play and rattle and automatically compensating for wear of the bearing surfaces.

The shortcomings of conventional half-ball and socket joints are many. The load carrying capability of the joints is limited to the relatively small area of the peripheral surface of the half-ball engaged with the corresponding surface of the socket. A complex structure is required for providing pre-load of the bearing surfaces in arrangements where it is desired to prevent rattles and play, and to ensure automatic break-in and usage wear compensation. The amount of angulation between the elements interconnected by the joint and the load carrying characteristics of the assembly are limited.

SUMMARY OF THE INVENTION

The invention disclosed in prior application Ser. No. 061,644 and the present invention remedy the inconveniences and shortcomings of the prior art by providing a knuckle or swivel joint structure which is a mechanical equivalent of conventional full-ball and socket joints but which is lighter in weight and therefore uses less material and which has fewer parts than generally requires for knuckle or swivel joints for heavy-duty applications, such as truck or tractor tie rods, drag links, torque rods and the like. In addition, they provide a knuckle or swivel joint which is able to handle large amounts of angular displacement between the joined elements, which has a tight fit between the bearing surfaces in mutual engagement, which is devoid of play and is rattle-proof, and which automatically compensates for break-in and usage wear.

The present invention accomplishes its many objects by way of a knuckle or swivel joint structure comprising a stud member terminating in an integral hollow half-ball head member whose peripheral spherical surface engages a conforming concave spherical surface of the corresponding socket member, the half-ball member having a concave cavity generally hemispherical, in which is engaged a resilient or elastomeric biasing insert pre-stressed in compression during assembly such as to hold the half-ball peripheral surface in swivelling sliding engagement with the socket spherical bearing surface. Pre-load of the bearing surfaces in engagement may also be effected, in addition of pre-stressing the biasing member, by means of a resilient retainer rather than a rigid retainer for holding the diverse parts in assembly or, alternatively, by means of a substantially non-resilient retainer provided by a resilient member urging the retainer in the direction tending to increase the pre-load applied to the biasing member.

Other objects and advantages of the present invention will become apparent to those skilled in the art when the following description of the best modes contemplated for practicing the invention is read in conjunction with the accompanying drawing wherein like numerals refer to like or equivalent parts and in which:

BRIEF DESCRIPTION OF THE DRAWING

FIG. 1 is a side elevation view partly in section of an example of a knuckle or swivel joint according to the present invention;

FIG. 1a is a view similar to FIG. 1, but showing the components in position prior to final assembly;

FIGS. 2 and 2a are views similar to, respectively, FIGS. 1 and 1a, but showing a modification of the invention;

FIG. 3 is a view similar to FIG. 1, showing another modification thereof;

FIGS. 4 and 4a are views similar to, respectively, FIGS. 1 and 1a, but showing a further modification thereof;

FIGS. 5 and 5a are views similar to, respectively, FIGS. 1 and 1a, but showing another modification thereof; and FIGS. 6 and 6a are views similar to, respectively, FIGS. 1 and 1a, but showing another modification thereof.

DETAILED DESCRIPTION OF THE PREFERRED EMBODIMENTS

Referring to the drawing and more particularly to FIGS. 1–1a, an example of structure for a knuckle or swivel joint 10 according to the present invention consists of a stud 12 provided at one end with an integral cold-headed half-ball 14 having a peripheral convex spherical surface 16 and a cavity or recess 18 provided with a concave hemispherical surface 20. In assembly, the half-ball 14 of the stud and half-ball integral unit is disposd within a socket member 22 provided with a shank 24 fastened to the periphery of the socket member by any convenient means, such as by friction welding, the socket member 22 having a bore 26 from which projects the stud 12. The peripheral convex spherical surface 16 of the half-ball 14 slidingly engages the inner concave spherical surface portion 28 of the bore 26 of the socket 22 and is capable of swivelling relative thereto. A biasing member 30, made of elastomeric material such as neoprene, acrylonitrile-butadiene-styrene (ABS), acetal phenoxy polysulfane, styrene-butadiene, urethane resins, and the like, provided with a substantially spherical peripheral surface 32 conforming in dimension, after assembly of the elements (FIG. 1), with the concave hemispherical surface 20 of the cavity or recess 18 in the half-ball 14, is disposed within the recess or cavity 18 such that the conforming hemispherical concave surface 20 of the half-ball recess 18 and the spherical surface 32 of the biasing member 30 are in swivelling sliding engagement with each other. A generally disk-shaped retainer cap 34 having a partially spherical central concave portion 36 is disposed opposite the hemispherical cavity or recess 18 in the half-ball 14, and is held in position, with some clearance as shown at 38, between a shoulder portion 40 in the socket 22 and a lip 42 formed when the rim 44, FIG. 1a, of the socket 22 is bent over by swaging, such as to hold the components of the knuckle or swivel joint 10 in assembly, as illustrated at FIG. 1.

As shown at FIG. 1a, the biasing member 30, prior to swaging the rim 44 of the socket 22, has an elipsoidal shape which becomes flattened to a generally spherical shape after assembly and swaging of the socket rim 44 to the lip 42, with the result that the elastomeric biasing member 30 is compressed or pre-stressed such as to exert a pre-load force in a direction that urges the spherical portion 32 of its surface in the half-ball cavity 18 firmly in engagement with the convex hemispherical surface 20. Consequently, the partially spherical surface 16 of the half-ball 14 is urged in firm swivelling engagement with the partially spherical surface 28 of the socket 22. The amount of compression of the biasing member 30, and therefore the amount of pre-load of the bearing surfaces of the knuckle or swivel joint 10 is determined by how much the retainer cap 34 is displaced during swaging and forming of the holding lip 42 at the rim 44 of the socket 22.

The bearing surfaces in mutual swivelling engagement may be pre-lubricated prior to assembly of the diverse components or, in the alternative and as illustrated, the retainer cap 34 may be provided with a grease fitting 46, and the surface of the retainer cap spherical surface 36 may be provided with grease passageways in the form of grooves 48, such as to provide a means for periodically refilling the joint with lubricant. The retainer cap 34 acts as an effective seal for retaining grease within the joint and for preventing the introduction of foreign matter into the socket 22 from an end of the socket. A resilient pliable bellows seal 50, as disclosed in more detail in co-pending application Ser. No. 251,253, filed Apr. 6, 1981, in the name of William H. Trudeau, and assigned to the same assignee as the present application, acts as a grease retainer at the other end of the socket 22 through which projects the stud 12, and as a seal against introduction of dirt into the joint through that end of the socket.

The structure of the knuckle or swivel joint 10' of FIGS. 2-2a is identical to the structure of the joint 10 of FIGS. 1-1a, with the exception of the recess or cavity 18 in the half-ball 14 being provided with a bottom flat surface 52 engaged by a corresponding flat surface 54 at one end of the elastomeric biasing member 30. The elastomeric biasing member 30 is of generally cylindrical shape when in its state prior to final assembly of the components and to pre-load, FIG. 2a, and has another end flat surface 56 engaged with a corresponding flat surface 58 formed substantially at the center of the retainer cap 34. When pre-stressed and compressed after final assembly, the biasing member 30, from an original generally cylindrical shape or slightly barrel-shaped, takes a more pronounced barrel shape by lateral expansion such as to substantially fill the spherical surface portion 20 of the recess 18 in the half-ball 14.

FIGS. 2-2a also illustrate a modified lubricant distribution system for the bearing surfaces of the knuckle or swivel joint comprising a grease channel 60 formed along the longitudinal axis of the elastomeric biasing member 30 which places the outlet of the grease fitting 46 in communication with one or more transverse grease passageways 62 open at an end to the bearing spherical surfaces 28 of the socket 22 and 16 of the half-ball 14. Grooves 64 are formed in the flat surface 52 at the bottom of the recess 18 in the half-ball 14 to enable the lubricant to flow from the outlet of the channel 60 to the inlets of the transverse passageways 62. A thin disk-shaped member, not shown, may be disposed between the flat end face 54 of the elastomeric biasing member 30 and the recess flat surface 52.

Due to the generally spherical shape of the biasing member 30 of the joint of FIG. 1 in its pre-stressed or compressed state after assembly of the components, and in view of the spherical surface 32 of the biasing member 30 being in engagement with a generally hemispherical concave surface 20 of the recess 18 in the half-ball 14, the stud 12 may be swivelled relative to the socket 22 to any amount of angulation permissible by design, without any tendency for return of the stud 12 to a neutral or favored position, and without any variation in the resistant torque as a function of angulation between the stud 12 and shank 24. However, the joint 10' of FIG. 2 is, by construction, subject to an increase, as a function of angulation, in the resistant torque opposing angulation of the stud 12 relative to the socket 22 and shank 24 in view of the fact that the biasing member 30, provided with flat end faces 54 and 56, respectively, in engagement with the flat surface 52 at the bottom of the ball recess 18 and with the flat surface 58 of the retainer cap 34, is caused to be further compressed during angulation on the one side corresponding to the direction of swivelling and to relax on the opposite side, such that the resistant torque progressively increases as a function of the angle of swivelling. Furthermore, when the force causing angulation is released, the uneven stress applied to the biasing member 30 urges the half-ball 14 and consequently the stud 12 to return to the position, neutral position or a position of equilibrium, illustrated at FIG. 2.

This tendency to return the joint to a neutral equilibrium position may be further accentuated, if so desired, for example by providing the pre-stressed biasing member 30 with the shape illustrated at FIG. 3. In the structure of FIG. 3, the elastomeric biasing member 30 has a substantially hemispherical portion 66 engaged with the substantially hemispherical concave surface 20 of the recess 18 in the half-ball 14, and an annular portion 68 disposed between the retainer cup 34, which has an inner flat surface 70, and an annular end surface 72 remaining on the half-ball 14 peripherally to the recess 18 therein. During assembly, when the retainer cap retaining lip 42 is swaged, thus urging the retainer cap 34 in the direction that causes pre-load compression of the biasing member 30, the annular portion 68 of the biasing member 30 may be left uncompressed, or it may be slightly compressed or compressed to any degree desired. It will be appreciated that the biasing member 30, in its relaxed uncompressed state, may be shaped such that the amount of pre-load compression of its spherical portion 66 may be the same or may be different from that of the amount of compression of its annular portion 68. For example, the amount of pre-load compression of the annular portion 68 of the biasing member 30 may be less, if any, than the amount of pre-load compression of the spherical portion 66 thereof, it may be the same or it may be more. However, when the stud 12 is swivelled relative to the socket 22, the biasing member annular portion 68 is subjected to further compression where the angulation motion causes the annular end surface 72 of the half-ball 14 to move closer to the surface 70 of the retainer cap 34, with the result that the resistant torque, opposing angulation, increases in great proportion as a function of angulation, and that the uneven further compression of the biasing member annular portion 68 strongly tends to return the stud 12 to a neutral equilibrium position, for example, that illustrated at FIG. 3.

Referring now to FIG. 4, a knuckle or swivel joint 10a according to another aspect of the invention comprises a biasing insert member 30 made of incompressible but elastic material, such as nylon, vinyl, polyurethane, and the like, having an elastically deformable flange portion 74 provided with an edge 76 engaged with the end annular face 72 of the half-ball 14. The retainer cap 34 is, preferably, at least slightly flexible such that when the end flange 44 of the socket 22, FIG. 1a, is swaged to form the lip 42, at least a slight biasing action is transferred from the slightly deformed retainer cap 32 to the biasing insert member 30 urging its peripheral substantially hemispherical surface 66 in engagement with the concave hemispherical surface 20 of the half-ball recess 18. In the structure of FIG. 4, however, most of the pre-load force exerted on the ball 14 is provided by the edge 76 of the biasing insert flange 72 elastically deformed during assembly of the joint. It will be readily appreciated that in such a structure, as illustrated at FIG. 4, careful design of the geometric shape of the biasing insert member 30, the thickness of its integral annular flange 74, the diameter of the flange, the amount of bow of the flange prior to installation, the careful choice of the material used for making the biasing insert 30, together with the flexibility of the retainer cap 34 and the deformation of the retainer cap during assembly, all are important factors determining the amount of pre-load of the swivelling bearing surfaces, and the force which must be exerted for angulating the joint.

FIG. 4a represents the general appearance of an uncompressible biasing insert member 30, provided with a highly flexible flange 74, and the appearance of a highly flexible strongly dished retainer cap 34 prior to assembly by swaging the rim 44 of the socket 22. After swaging of the rim 44 of the socket 22 the general appearance of the assembly is substantially as illustrated at FIG. 4.

The structure of knuckle joint 10′a of FIG. 5, is identical to the structure of FIG. 2, that is providing a knuckle or swivel joint with a biasing insert member 30 made of elastomeric compressible material, but, in addition, holding the components in assembly by means of a resiliently deformable retainer cap 34 elastically deformed during swaging of the rim 44, FIG. 5a, of the socket 22 to form the retaining lip 42, FIG. 5. In this manner, the pre-load and wear takeup capability of the joint is provided in part by the compressed elastomeric biasing insert member 30 and in part by the elastically deformed retainer cap 34.

Means other than an elastically deformable retainer cap may be used for providing of the pre-load and wear takeup capability of the knuckle or swivel joint of the invention such as, for example, an elastomeric ring compressed between the swaged lip 42 and the lower surface, as shown in the drawing, of the retainer cap 34 proximate its edge or, as illustrated at FIGS. 6-6a, a dished annular spring member 80, FIG. 6a, which is elastically deformed to a substantially flat shape, FIG. 6, during swaging of the rim 44 of the socket 22 to form the retaining lip 42.

Having thus described the present invention by way of structural examples thereof, modification whereof will be apparent to those skilled in the art, what is claimed as new is as follows:

1. A ball joint structure comprising a stud and a half-ball member integrally formed at one end of said stud, a peripheral convex spherical surface on said half-ball member, a recess in the end of said half-ball member opposite to said stud, a socket member having a concave spherical surface engaged with the peripheral convex spherical surface of said half-ball member, said stud projecting through one end of said socket member, a generally disk-shaped retainer cap closing the other end of said socket member, and a biasing insert member disposed between said half-ball member and said retainer cap member, said biasing insert member having an end engaged in said recess in said half-ball member and another end engaged with said retainer cap, said biasing insert member being adapted to apply a biasing pre-load force on said half-ball member urging said engaged spherical surfaces in mutual swivelling sliding engagement, wherein said biasing insert member is made of elastomeric material compressibly deformed between said half-ball member and said retainer cap and said elastomeric biasing insert has a substantially ellipsoidal spherical surface compressed to a substantially spherical surface when engaged in said recess in the end of said half-ball and between said half-ball and said retainer cap.

2. The ball joint structure of claim 1 wherein said retainer cap is substantially rigid.

3. The ball joint structure of claim 2 wherein said biasing insert member has an annular portion disposed between said retainer cap and an annular surface surrounding said recess in said half-ball.

4. The ball joint structure of claim 1 wherein said retainer cap is relatively elastically deformed such as to urge said biasing insert member in a direction causing said spherical surfaces to be engaged in mutual swivelling sliding engagement.

5. A ball joint structure comprising a stud and a half-ball member integrally formed at one end of said stud, a peripheral convex spherical surface on said half-ball member, a recess in the end of said half-ball member opposite to said stud, a socket member having a concave spherical surface engaged with the peripheral convex spherical surface of said half-ball member, said stud projecting through one end of said socket member, a generally disk-shaped retainer cap closing the other end of said socket member, and a biasing insert member disposed between said half-ball member and said retainer cap member, said biasing insert member having an end engaged in said recess in said half-ball member and another end engaged with said retainer cap, said biasing insert member being adapted to apply a biasing pre-load force on said half-ball member urging said engaged spherical surfaces in mutual swivelling sliding engagement, wherein said biasing insert member is made of non-compressible material and has a spherical portion engaged in said recess in said half-ball recess, said recess having a conforming hemispherical shape, and an integral rim outwardly projecting from said insert member and having an edge springingly engaging an annular surface surrounding said recess in said half-ball.

6. The ball joint structure of claim 5 wherein said retainer cap is substantially rigid.

7. The ball joint structure of claim 5 wherein said retainer cap is flexibly deformed such as to apply to said biasing insert member a force causing said spherical surfaces to be engaged in mutual swivelling sliding engagement.

8. The ball joint structure of claim 1 wherein said elastomeric biasing insert member has substantially flat end faces, one of said end faces being engaged with a flat surface at the bottom of said recess and the other being engaged with the interior surface of said retainer cap when said biasing insert member is compressed between said half-ball and said retainer cap.

9. The ball joint structure of claim 1 further comprising a grease fitting disposed substantially at the center of said retainer cap for filling said ball joint with grease.

10. The ball joint structure of claim 9 further comprising grease passageways from the outlet of said grease fitting to said bearing surfaces in mutual swivelling sliding engagement.

11. The ball joint structure of claim 10 wherein one of said grease passageways is a channel formed through said biasing insert member.

12. The ball joint structure of claim 2 further comprising biasing means applied to said retainer cap for providing an additional pre-load force.

13. The ball joint structure of claim 4 further comprising biasing means applied to said retainer cap for providing an additional pre-load force.

14. The ball joint structure of claim 5 further comprising biasing means applied to said retainer cap for providing an additional pre-load force.

15. The ball joint structure of claim 6 further comprising biasing means applied to said retainer cap for providing an additional pre-load force.

16. The ball joint structure of claim 7 further comprising biasing means applied to said retainer cap for providing an additional pre-load force.

17. The ball joint structure of claim 1 further comprising biasing means applied to said retainer cap for providing an additional pre-load force.

18. The ball joint structure of claim 8 further comprising biasing means applied to said retainer cap for providing an additional pre-load force.

19. The ball joint structure of claim 9 further comprising biasing means applied to said retainer cap for providing an additional pre-load force.

20. The ball joint structure of claim 10 further comprising biasing means applied to said retainer cap for providing an additional pre-load force.

21. The ball joint structure of claim 11 further comprising biasing means applied to said retainer cap for providing an additional pre-load force.

* * * * *

UNITED STATES PATENT AND TRADEMARK OFFICE
CERTIFICATE OF CORRECTION

PATENT NO.   :   4,431,328
DATED        :   February 14, 1984
INVENTOR(S)  :   Joseph E. Smith It is certified that error appears in the above-identified patent and that said Letters Patent is hereby corrected as shown below:

Col. 1, lines 48-49, change "requires" to --required--.

Col. 4, line 47, change "cup" to --cap--.

Col. 5, line 18, change "la" to --4a--.

Col. 5, line 20, change "32" to --34--.

Col. 5, line 59, after "providing" insert --part--.

Signed and Sealed this

Second Day of January, 1990

Attest:

JEFFREY M. SAMUELS

Attesting Officer    Acting Commissioner of Patents and Trademarks